United States Patent
Kang (10) Patent No.: US 7,909,058 B2
(45) Date of Patent: Mar. 22, 2011

(54) VALVE-INTENSIVE BUTTON FOR ADJUSTING HEIGHT OF CUSHION SEAT FOR VEHICLE

(75) Inventor: Seong Mo Kang, Yongin-si (KR)

(73) Assignee: Ewon Comfortech Co., Ltd., Chungcheongnam-do (KR)

( * ) Notice: Subject to any disclaimer, the term of this patent is extended or adjusted under 35 U.S.C. 154(b) by 469 days.

(21) Appl. No.: 12/131,634

(22) Filed: Jun. 2, 2008

(65) Prior Publication Data
US 2009/0050220 A1    Feb. 26, 2009

(30) Foreign Application Priority Data
Aug. 20, 2007    (KR) .................. 10-2007-0083543

(51) Int. Cl.
*F16K 31/44*    (2006.01)
(52) U.S. Cl. ................ 137/596.17; 137/636.1; 267/131; 296/65.02; 248/550
(58) Field of Classification Search .................. 137/596, 137/596.17, 636, 636.1; 267/131; 296/65.02; 248/550
See application file for complete search history.

(56) References Cited

U.S. PATENT DOCUMENTS

| | | | | |
|---|---|---|---|---|
| 2,274,917 | A | * | 3/1942 | Carlson et al. ............. 137/636.1 |
| 2,311,465 | A | * | 2/1943 | Parker ......................... 137/636.1 |
| 4,213,594 | A | * | 7/1980 | Pietsch et al. ................. 248/550 |
| 4,272,117 | A | * | 6/1981 | Vilbeuf ....................... 296/65.02 |
| 4,589,695 | A | * | 5/1986 | Isono .......................... 297/284.9 |
| 4,645,169 | A | * | 2/1987 | Mischer ......................... 248/550 |
| 4,941,641 | A | * | 7/1990 | Granzow et al. ............... 248/588 |
| 4,946,145 | A | * | 8/1990 | Kurabe .......................... 267/131 |

FOREIGN PATENT DOCUMENTS
KR    100457801    * 11/2004
* cited by examiner

*Primary Examiner* — Craig M Schneider
(74) *Attorney, Agent, or Firm* — Saliwanchik, Lloyd & Eisenschenk (57) ABSTRACT

The present invention relates to a manipulation button 40 for adjusting the height of a cushion seat for a vehicle that is capable of absorbing the shocks applied to a driver sitting on the cushion seat while the vehicle is being driven on a relatively rough road, and more particularly, to a button for adjusting the height of a cushion seat for a vehicle that is capable of adjusting the height of the cushion seat according to a driver's physical conditions and his desired driving posture, wherein a plurality of pneumatic valves having flow channels formed therein are intensively configured with one another in such a manner as to be operated by means of the seesaw type button 41, thereby effectively performing the ascending and descending motions of the cushion seat in a simple manner.

4 Claims, 9 Drawing Sheets

PRIOR ART

FIG. 8C

VALVE-INTENSIVE BUTTON FOR ADJUSTING HEIGHT OF CUSHION SEAT FOR VEHICLE

CROSS-REFERENCE TO RELATED APPLICATION

The present application claims the benefit under 35 U.S.C. §119 of Korean Patent Application No. 10-2007-0083543, filed Aug. 20, 2007, which is hereby incorporated by reference in its entirety.

BACKGROUND OF THE INVENTION

1. Field of the Invention

The present invention relates to a manipulation button for adjusting the height of a cushion seat for a vehicle that is capable of absorbing the shocks applied to a driver sitting on the cushion seat while the vehicle is being driven on a relatively rough road, and more particularly, to a button of a cushion seat for a vehicle that is capable of adjusting the height of the cushion seat according to a driver's physical conditions and his desired driving posture, when considering vehicles like business buses or trucks are driven alternatively by lots of drivers, wherein a plurality of pneumatic valves having flow channels formed therein are intensively configured with one another in such a manner as to be operated by means of the seesaw type button, thereby effectively performing the ascending and descending motions of the cushion seat in a simple manner.

2. Background of the Related Art

Figure 1:
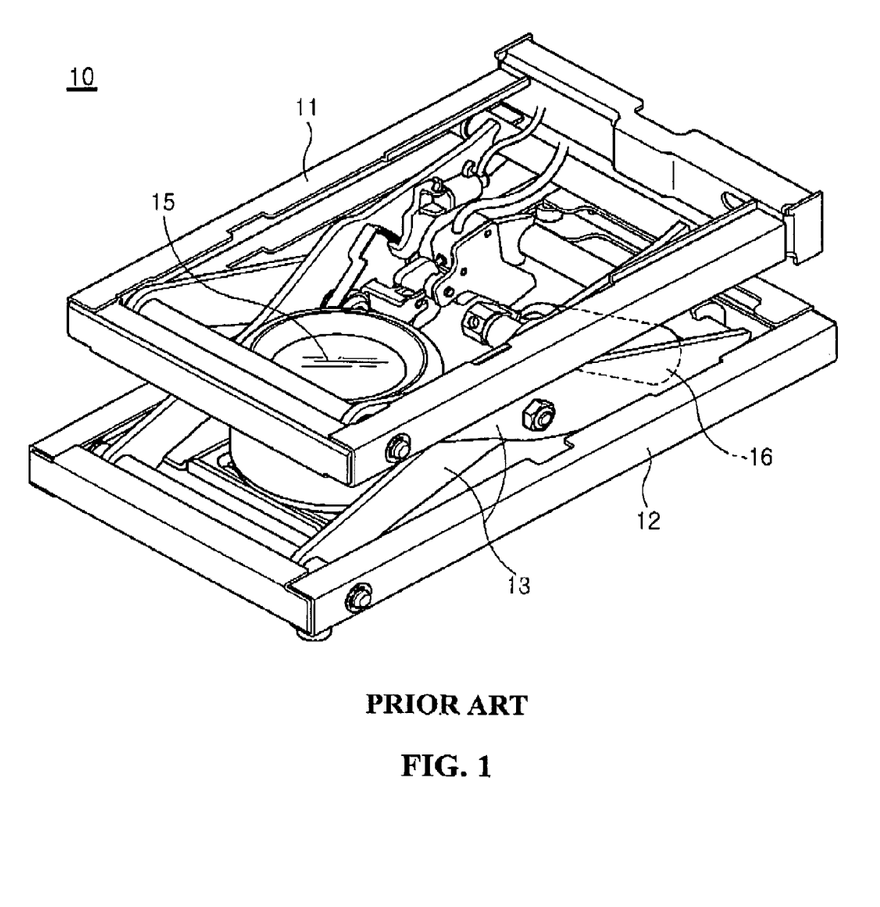
FIG. 1 is a perspective view showing a shock absorber of a cushion seat for a vehicle.

Conventionally, a damper 16, an air spring 15 and a balance valve 30 are mounted on the underside of a vehicle cushion seat so as to alleviate a driver's fatigue by absorbing the shocks applied to a vehicle from a road surface during driving and simultaneously promote a safe driving, as shown in FIG. 1. As a result, even though the vehicle is vibrated in upward and downward directions by the application of the shocks from the road surface, the height of the cushion seat is always maintained constantly, thereby performing convenient safe driving.

Meanwhile, there has been proposed Korean Patent No. 457801 entitled "control valve for adjusting height of cushion seat for vehicle" as filed by the same applicant as in this invention, wherein an initial height of the cushion seat is changeably set according to a driver's physical conditions and his desired driving posture. The control valve has an excellent performance, but lots of parts (first rod, second rod, a wire cable and so on) are additionally mounted, which causes the configuration to be more complicated to accompany lots of failure factors.

BRIEF SUMMARY

Accordingly, the present invention has been made in view of the above-mentioned problems occurring in the prior art, and it is an object of the present invention to provide a valve-intensive button for adjusting the height of a cushion seat for a vehicle that is capable of simultaneously operating an air spring and a gear cylinder mounted at the underside of the cushion seat by means of one-time manipulation of the button and that is configured compact, while being controlled by the intensive pneumatic valves having simple flow channels therein, thereby overcoming the conventional problem in that a large number of parts are additionally needed.

To accomplish the above object, according to the present invention, there is provided a valve-intensive button for adjusting the height of a cushion seat for a vehicle that includes: an air spring control part having a first port having a first pressing member mounted thereon, a second port having a second pressing member mounted thereon, a first T-shaped flow channel defined by the first port and the second port, and a first connection port adapted to communicate with the first T-shaped flow channel so as to allow compressed air to be supplied and discharged to an air spring; and a gear cylinder control part having a third port having a third pressing member mounted thereon, a fourth port having a fourth pressing member mounted thereon, a second T-shaped flow channel defined by the third port and the fourth port, and a second connection port adapted to communicate with the second T-shaped flow channel so as to allow compressed air to be supplied and discharged to a gear cylinder, wherein the first and third ports communicate with a first supply port, the fourth port communicates with a second supply port, and the second port has an exhaust through-hole formed at the inside thereof, such that the air spring control part and the gear cylinder control part are coupled as a single body to each other.

According to the present invention, preferably, the second T-shaped flow channel of the gear cylinder control part has a bushing mounted at both sides thereof and a slidingly movable member mounted between the bushings, and each of the third and fourth pressing members has an exhaust hole formed on a through-hole side wall thereof. Moreover, the first to fourth ports are arranged in such a manner that the first and third ports or the second and fourth ports are pressurized at the time of pressing the button one time.

According to the present invention, the simple configuration can have relatively small failure factors when compared with the conventional practices, which enhances the productivity of the cushion seats for vehicles. Furthermore, the compact configuration permits the working period of time for coupling to the shock absorber of the cushion seat to be substantially reduced, thereby improving the production efficiency thereof.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a valve-intensive button for adjusting the height of a cushion seat for a vehicle according to the present invention will be given with reference to the attached drawings.

FIG. 1 is a perspective view showing a shock absorber adapted to support the underside of the cushion seat for a vehicle, wherein an air spring 15 and a damper 16 are mounted at the inside of upper and lower frames 11 and 12 connected by means of an X-shaped link 13, so as to release the shocks applied to the driver during the driving on a rough road. The air spring 15 serves to release the shocks applied to the cushion seat, and the damper 16 serves to prevent the cushion seat from being vibrated continuously.

Figure 2:
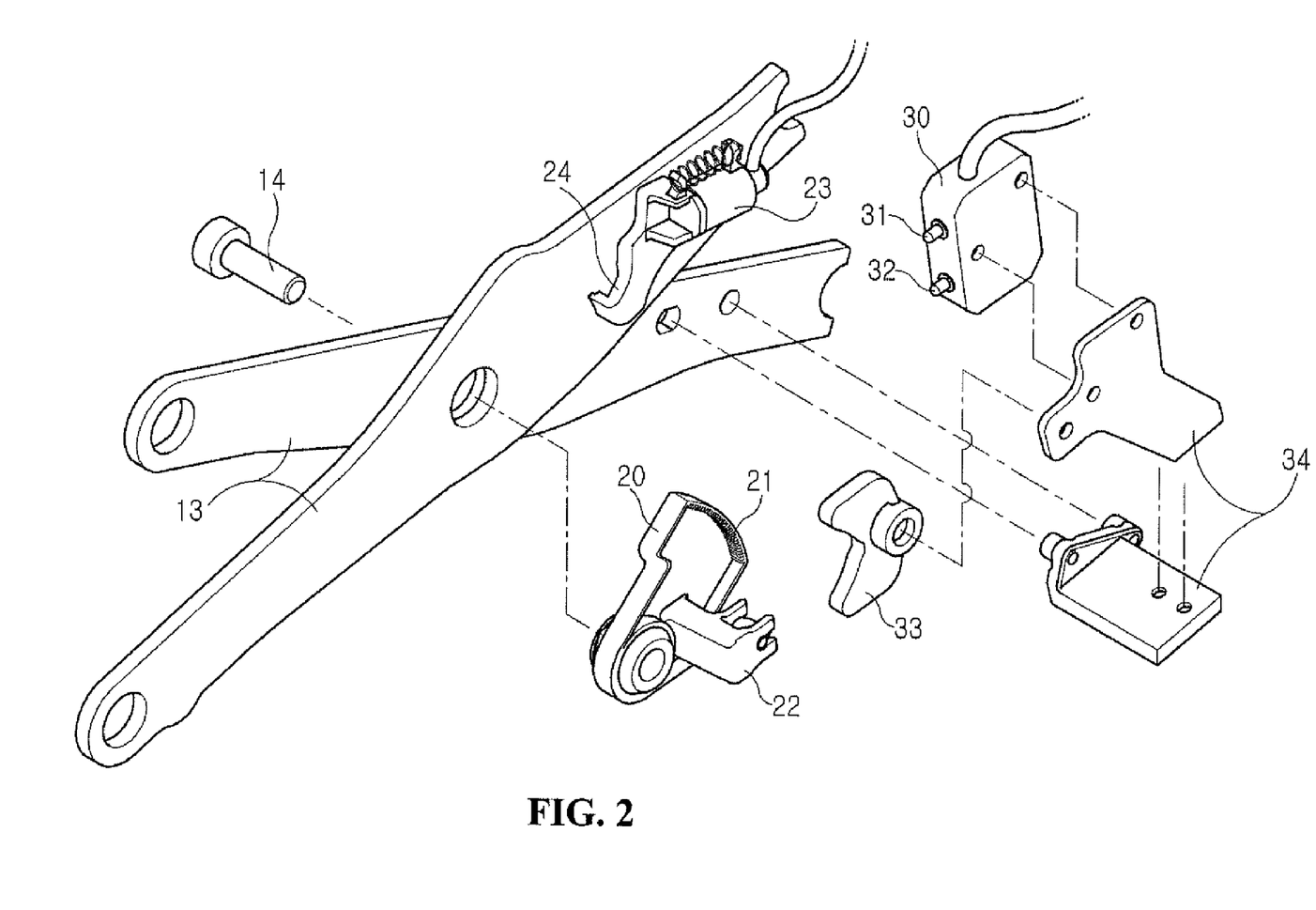
FIG. 2 is a separated perspective view showing the main parts mounted on an X-shaped link of the shock absorber.
Figure 3:
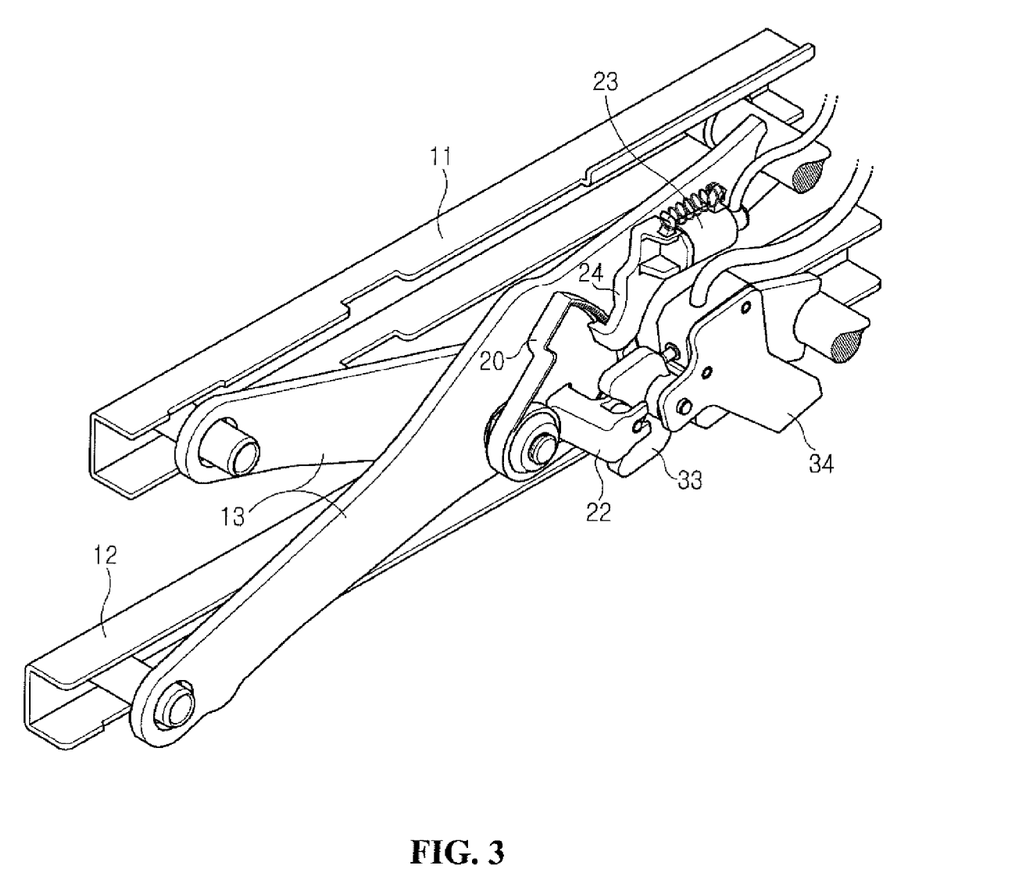
FIG. 3 is a perspective view showing the assembled state of the main parts mounted on the X-shaped link of the shock absorber.

Further, FIGS. 2 and 3 are separated and assembled perspective views showing the main parts mounted on the X-shaped link 13 of the shock absorber 10, and so as to adjust the height of the cushion seat according to a driver's physical conditions and his desired driving posture, as shown in FIG. 2, a rotor 20 is rotatably hinge-coupled on a crossing portion of the X-shaped link 13 by means of a rotary pin 14. The rotor 20 has an operating piece 22 functioning as a pressurizing means against a cam 33 and has a tooth 21 internal-coupled to a stopper 24 of a gear cylinder 23 mounted at the inside X-shaped link 13. The coupling between the rotor 20 and the gear cylinder 23 may be achieved through the external gear coupling as well as the internal gear coupling.

Also, the outside X-shaped link 13 has a balance valve 30 fixedly mounted by means of a fixing plate 34 so as to supply and discharge air to and from the air spring 15, and the fixing plate 34 has the cam 33 rotatably hinge-coupled on one side thereof so as to selectively pressurize an air injection pin 32 and an air discharge pin 31 of the balance valve 30.

Thus, the stopper 24 that is mounted on the inside X-shaped link 13 conducts a linear motion (or the rotary motion) by means of the gear cylinder 23 to restrict the rotation of the rotor 20, and the operating piece 22 that is mounted on the rotor 20 is rotated to pressurize and rotate the cam 33, such that the cam 33 selectively presses the air injection pin 32 and the air discharge pin 31 of the balance valve 30.

Figure 4A:
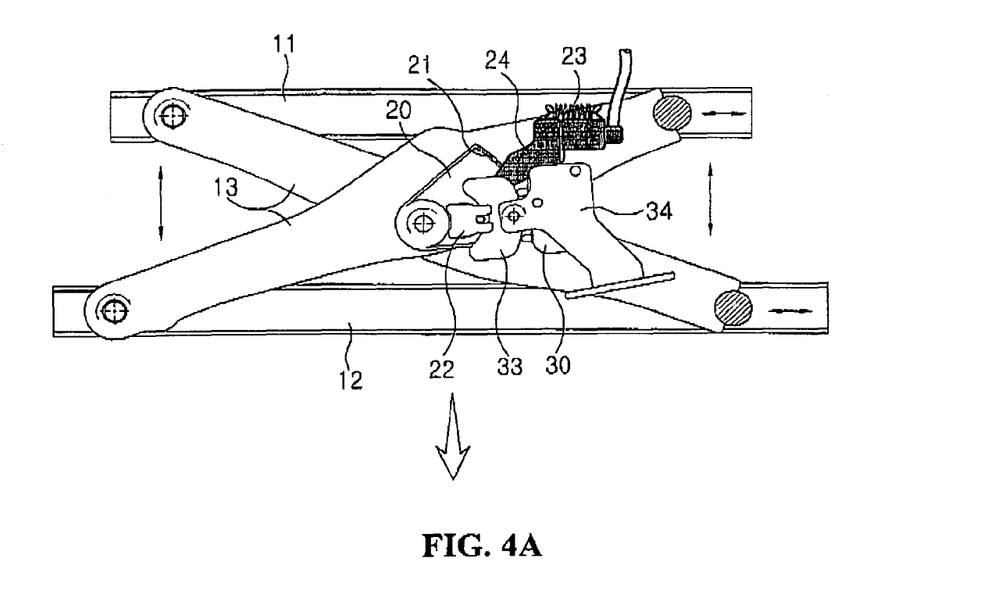
FIGS. 4a and 4b are schematic views showing the ascending and descending motions of the shock absorber by means of the X-shaped link.
Figure 4B:
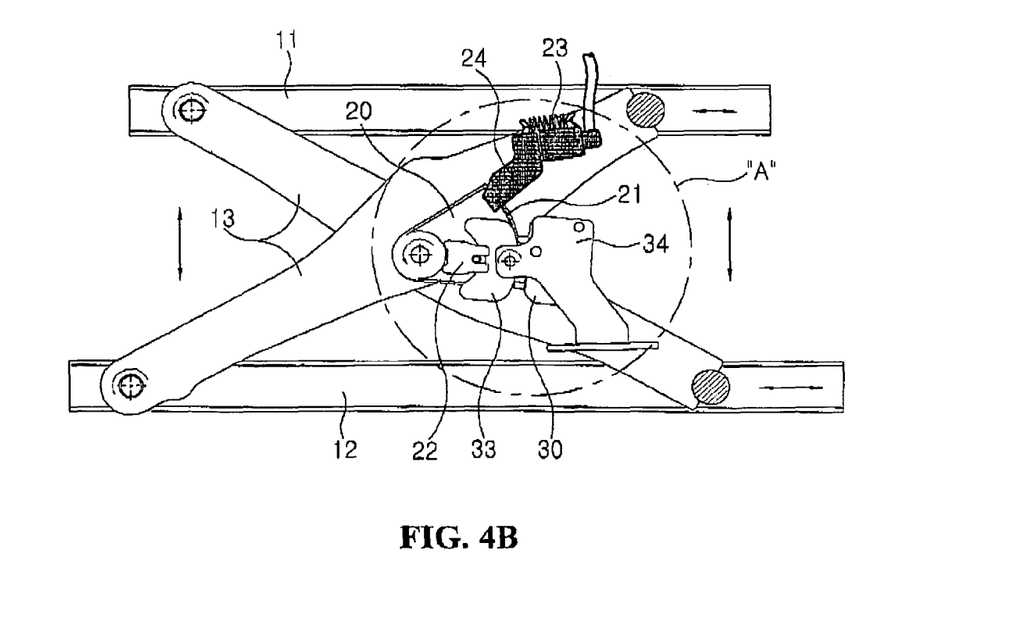

Referring now to FIGS. 4a and 4b, the ascending and descending motions of the shock absorber 10 for the vehicle that are conducted by means of the X-shaped link 13 will be described. The descending motion of the X-shaped link 13 is conducted in the reverse order to the ascending motion thereof, under the same principle. The X-shaped link 13 is rotatably hinge-coupled at one end thereof to the upper frame 11 and the lower frame 12, as shown in FIGS. 4a and 4b, and it has the other end thereof in such a manner as to conduct the linear motion on the upper frame 11 and the lower frame 12 at the time of performing the ascending motion.

In the ascending and descending motions of the X-shaped link 13, if air is supplied to the air spring 15, the ascending motion is conducted, and if air is discharged from the air spring 15, the descending motion is conducted. FIG. 4a shows the state where air is discharged from the air spring 15. In this state, if the ascending adjusting button generally mounted on the side of the cushion seat is pressed, the compressed air is supplied to the inside of the air spring 15 and simultaneously to the gear cylinder 23 that restricts the rotation of the rotor 20 at the state of being internal-coupled to the rotor 20, such that the stopper 24 is spaced apart from the tooth 21 of the rotor 20, thereby allowing the rotor 20 to be freely rotated.

At this time, the interval between the upper frame 11 and the lower frame 12 is distant from each other by means of the air spring 15 to which the compressed air is supplied, as shown in FIG. 4b, and the gear cylinder 23 is rotated together with the X-shaped link 13 as it is coupled to the inside X-shaped link 13. Since the stopper 24 of the gear cylinder 23 restricting the rotation of the rotor 20 is spaced apart from the rotor 20, the rotor 20 is not rotated, while being in contact with the cam 33 hinge-coupled thereto.

After that, if the ascending adjusting button is set to neutral by the driver, the compressed air being supplied to the air spring 15 is blocked to stop the ascending motion of the X-shaped link 13, and the simultaneously, the compressed air being supplied to the gear cylinder 23 is blocked, such that the stopper 24 engages with the tooth 21 of the rotor 20 to restrict the rotation of the rotor 20 again. The variations of the coupled positions between the stopper 24 of the gear cylinder 23 and the rotor 20 according to the ascending motion of the X-shaped link 13 are checked out in FIGS. 4a and 4b, such that it can be found that the rotor 20 and the cam 33 are maintained at their initial contact state, while the coupled positions between the stopper 24 of the gear cylinder 23 and the rotor 20 are being varied.

As mentioned above, it can be appreciated that the height of the cushion seat for a vehicle is adjusted according to a driver's physical conditions and his desired driving posture, as shown in FIGS. 4a and 4b. Next, the shock-absorbing operation performed at the portion "A" of FIG. 4b will be described with reference to FIGS. 5a and 5b.

Figure 5A:
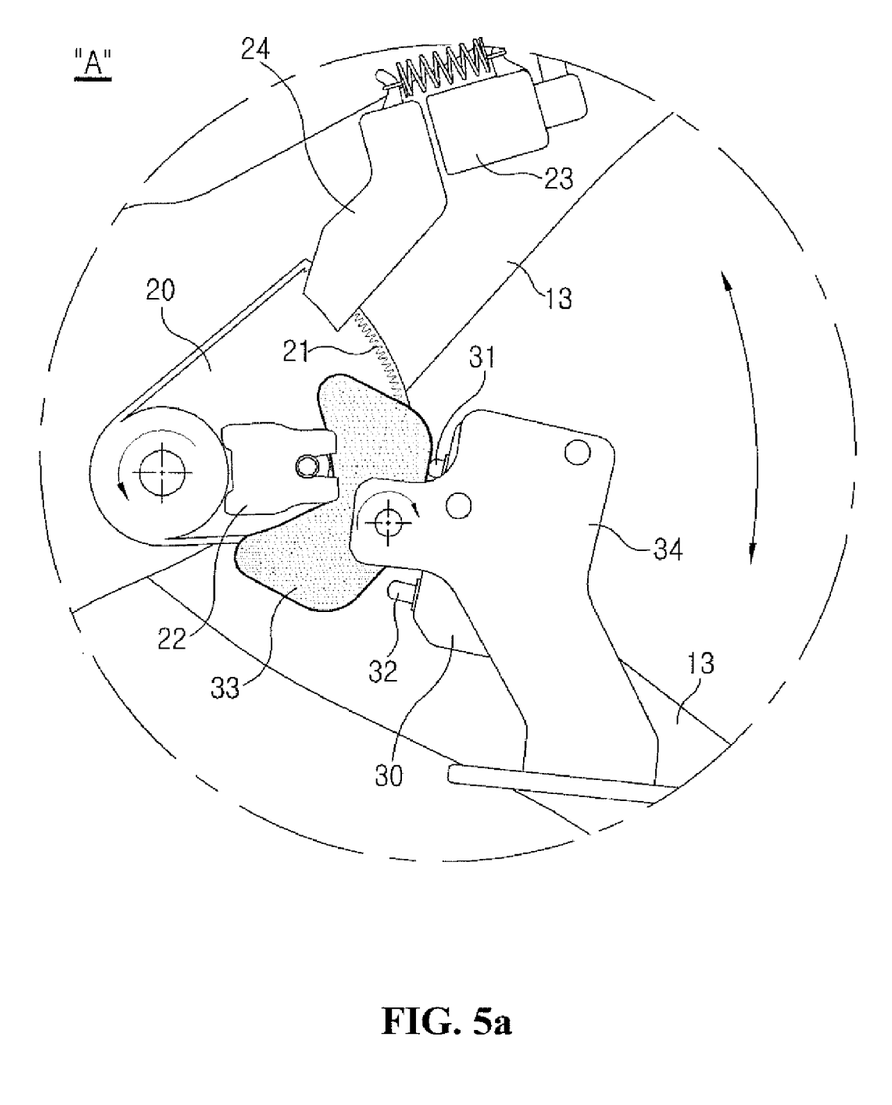
FIGS. 5a and 5b are enlarged views showing the portion "A" in FIG. 4 so as to explain an absorbing operation.

If the height of the cushion seat becomes high by irregular road surfaces, the interval between the upper frame 11 and the lower frame 12 is distant from each other, as shown in FIG. 5a, such that the gear cylinder 23 fixed to the X-shaped link 13 is rotated counter clockwise together with the X-shaped link 13, and simultaneously, since the rotor 20 is internal-coupled to the stopper 24 of the gear cylinder 23 by means of the tooth 21, the rotor 20 receives the rotary force of the gear cylinder 23 and thus rotates counter clockwise with respect to the rotary pin 14.

At this time, the operating piece 22 protrudedly formed on the rotor 20 rotates the cam 33 clockwise, as shown in FIG. 5a, such that the cam 33 pressurizes the air discharge pin 31 of the balance valve 30. Thus, the air existing inside the air spring 15 is discharged to fall the air pressure inside the air spring 15, such that the height of the cushion seat being high by the irregular road surfaces becomes instantly lowered and maintained to the height initially set.

Figure 5B:
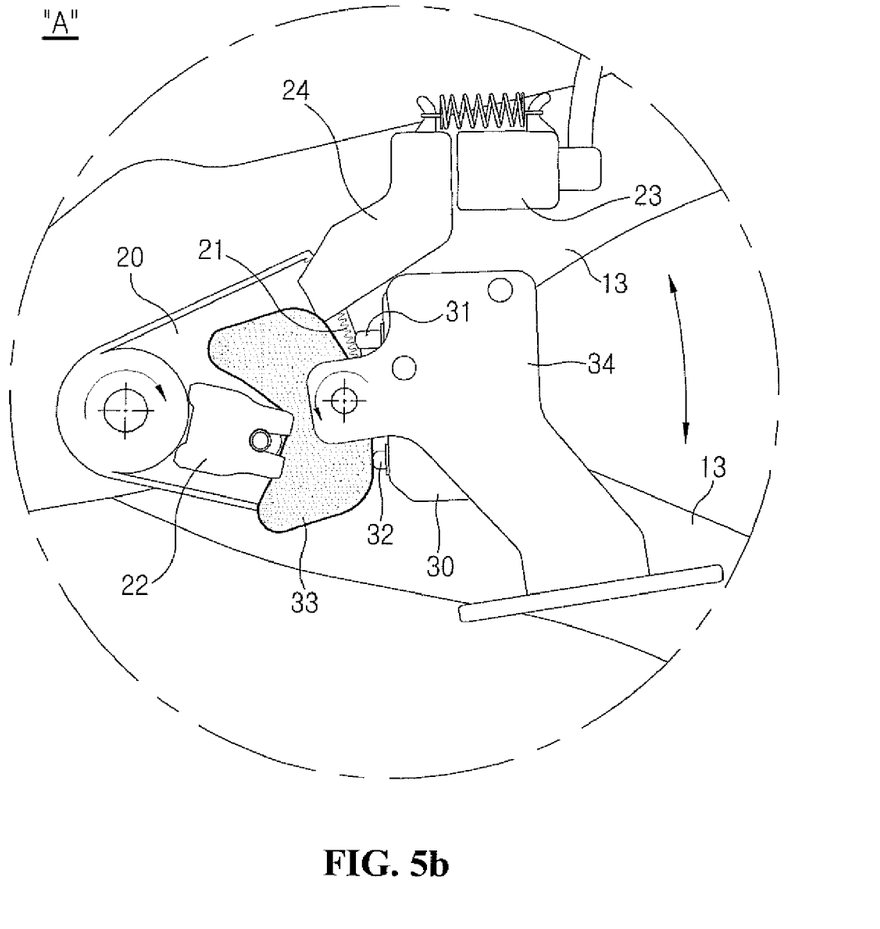

On the other hand, if the height of the cushion seat becomes lowered by the irregular road surfaces, the interval between the upper frame 11 and the lower frame 12 is close to each other, as shown in FIG. 5b, such that the gear cylinder 23 fixed to the X-shaped link 13 is rotated clockwise together with the X-shaped link 13, and simultaneously, since the rotor 20 is internal-coupled to the stopper 24 of the gear cylinder 23 by means of the tooth 21, the rotor 20 receives the rotary force of the gear cylinder 23 and thus rotates clockwise with respect to the rotary pin 14.

At this time, the operating piece 22 protrudedly formed on the rotor 20 rotates the cam 33 counter clockwise, as shown in FIG. 5b, such that the cam 33 pressurizes the air injection pin 32 of the balance valve 30. Thus, the compressed air is supplied to the inside of the air spring 15 to raise the air pressure inside the air spring 15, such that the height of the cushion seat being lowered by the irregular road surfaces becomes instantly high and maintained to the height initially set.

Under the above-mentioned configuration, the button for adjusting the height of the cushion seat for the vehicle according to the present invention can simultaneously operate the air spring 15 and the gear cylinder 23 mounted at the underside of the cushion seat by means of one-time manipulation of the button 41 and can be configured compact, while being controlled by the intensive pneumatic valves having simple flow channels therein, thereby overcoming the conventional problem that a large number of parts are additionally needed.

Figure 6:
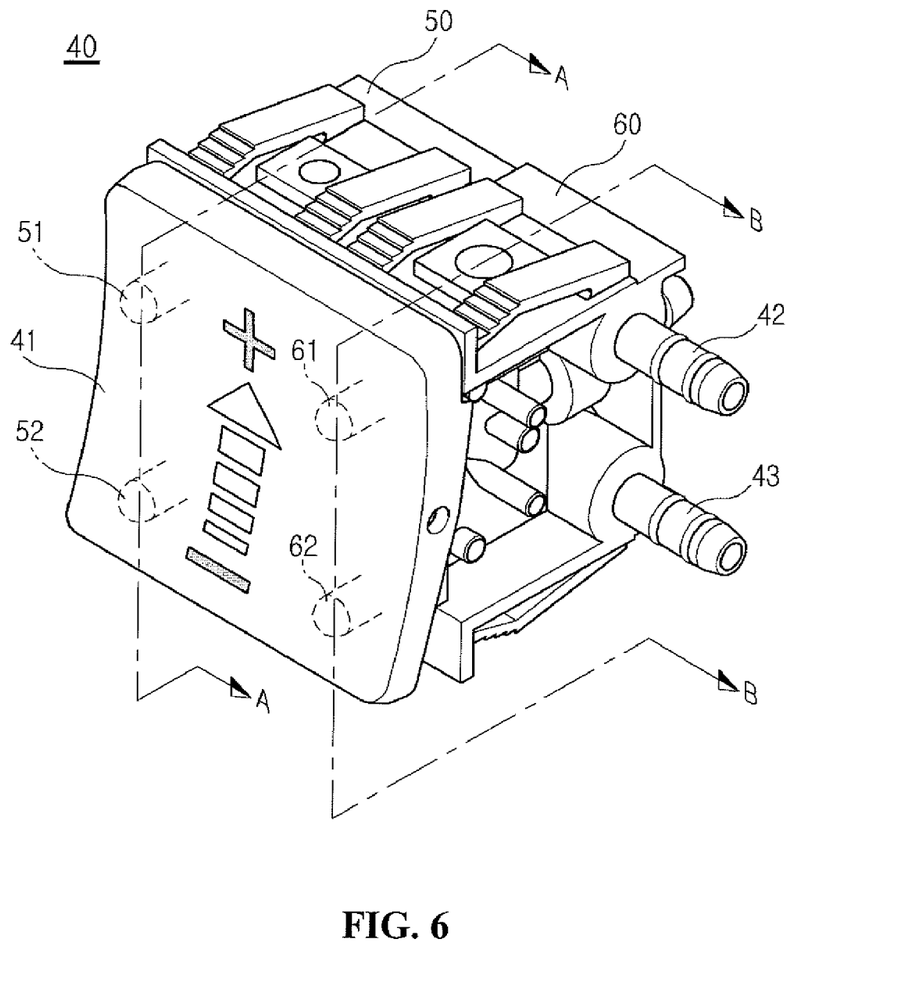
FIG. 6 is a perspective view showing a valve-intensive button for adjusting the height of a cushion seat for a vehicle according to the present invention.

FIG. 6 is a perspective view showing a valve-intensive button for adjusting the height of a cushion seat for a vehicle according to the present invention, wherein an air spring control part 50 that is adapted to supply and discharge the compressed air to and from the air spring 15 and a gear cylinder control part 60 that is adapted to supply and discharge the compressed air to and from the gear cylinder 23 are integrally coupled to each other and the seesaw type button 41 is mounted on the integrated air spring control part 50 and gear cylinder control part 60, such that the button 41 is pressed up and down according to the ascending and descending motions of the cushion seat.

So as to simultaneously control the air spring 14 and the gear cylinder 23 at the time of pressing the button 41 one time, first to fourth pressing members 51, 52, 61, and 62 are appropriately arranged under the button 41 such that first and third ports 53 and 63 are simultaneously opened or second and fourth ports 54 and 64 are simultaneously opened. Moreover, the first and third ports 53 and 63 communicate with a first supply port 42, and the fourth port 64 communicates with a second supply port 43. The second port 54 has an exhaust through-hole 57 formed at the inside thereof.

Figure 7A:
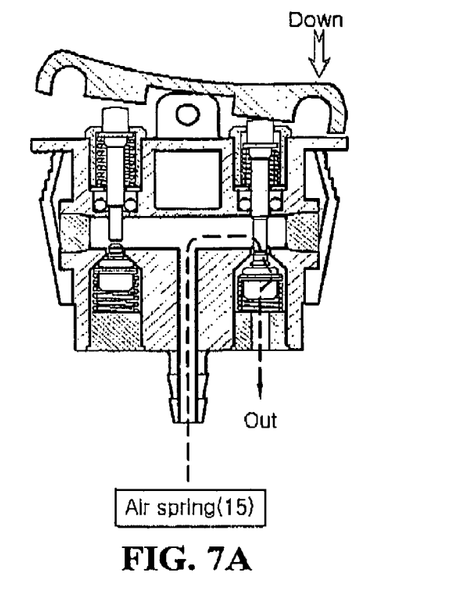
FIGS. 7a to 7c are sectional views showing the step by step manipulations in the line A-A of FIG. 6.
Figure 7B:
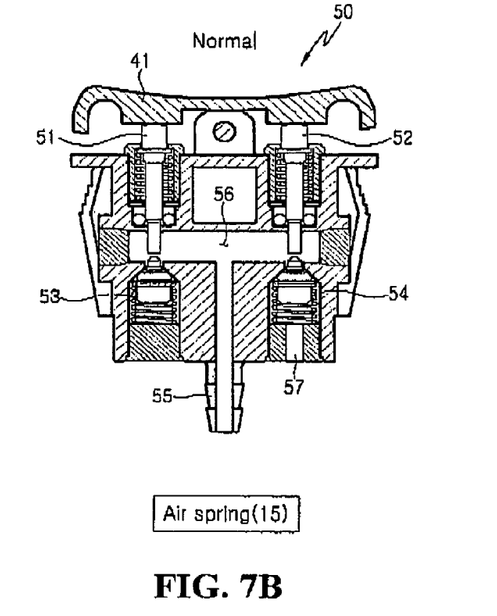
Figure 7C:
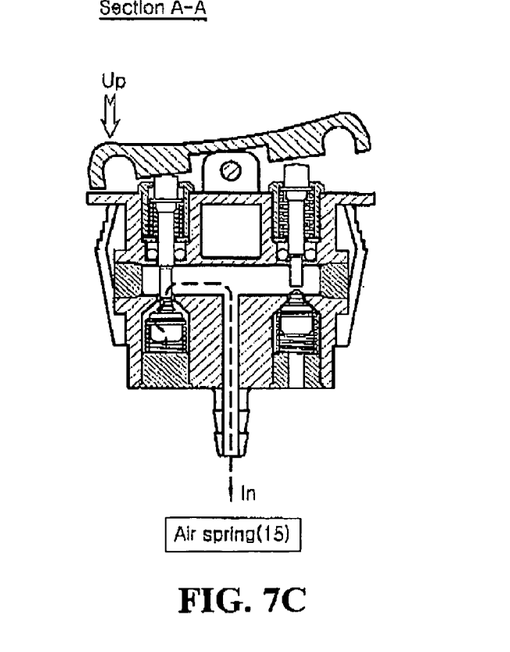

FIGS. 7a to 7c are sectional views showing the step by step manipulations in the line A-A of FIG. 6, wherein the section area of the air spring control part 50 is shown. As shown in FIGS. 7a to 7c, the first port 53 having the first pressing member 51 mounted thereon and the second port 54 having the second pressing member 52 mounted thereon define a first T-shaped flow channel 56, and a first connection port 55 is formed to communicate with the first T-shaped flow channel 56 in such a manner as to supply the compressed air flowing from the first T-shaped flow channel 56 to the air spring 15.

If the height of the cushion seat is raised according to a driver's physical conditions and his desired driving posture, the button 41 is pressed at one (up) side thereof as shown in FIG. 7a, such that the first pressing member 51 is pressurized and simultaneously the first port 53 is opened to allow the compressed air to be supplied through the first supply port 42 communicating with the first port 53, and then, the compressed air is passed through the first T-shaped flow channel 56 to the first connection port 55 and is finally supplied to the inside of the air spring 15, thereby causing the height of the cushion seat to be raised.

If the height of the cushion seat is lowered, the button 41 is pressed at the other (down) side thereof as shown in FIG. 7c, such that the second pressing member 52 is pressurized and simultaneously the second port 54 is opened to allow the compressed air inside the air spring 15 to be discharged through the exhaust through-hole 57 formed at the lower side of the second port 54, thereby causing the height of the cushion seat to be lowered.

Figure 8A:
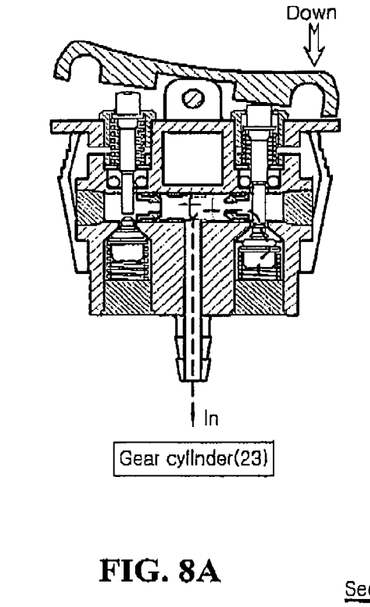
FIGS. 8a to 8c are sectional views showing the step by step manipulations in the line B-B of FIG. 6.
Figure 8B:
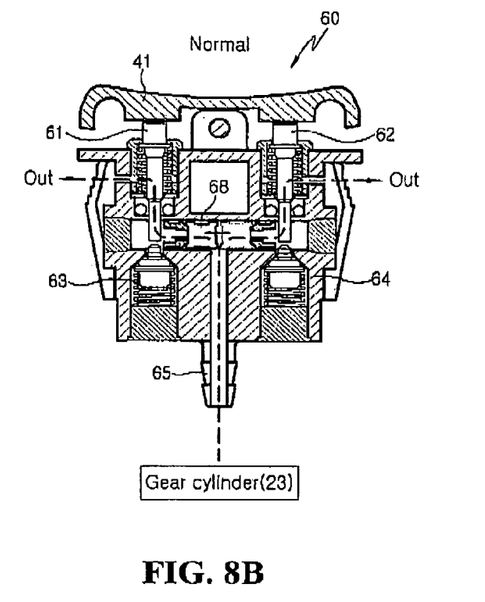
Figure 8C:
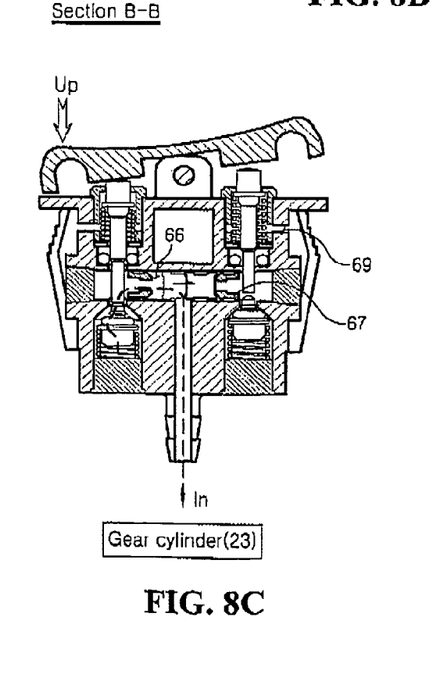

FIGS. 8a to 8c are sectional views showing the step by step manipulations in the line B-B of FIG. 6, wherein the section area of the gear cylinder control part 60 is shown. As shown in FIGS. 8a to 8c, the third port 63 having the third pressing member 61 mounted thereon and the fourth port 64 having the fourth pressing member 62 mounted thereon define a second T-shaped flow channel 66, and a second connection port 65 is formed to communicate with the first T-shaped flow channel 66 in such a manner as to supply the compressed air flowing from the second T-shaped flow channel 66 to the gear cylinder 23.

If the height of the cushion seat is raised, the button 41 is pressed at one (up) side thereof as shown in FIG. 8a, such that the third pressing member 61 is pressurized and simultaneously the third port 63 is opened to allow the compressed air to be supplied through the first supply port 42 communicating with the third port 63.

The compressed air supplied from the first supply port 42 serves to pressurize and push a slidingly movable member 68 that is slidingly mounted horizontally between the bushings 67 formed at the both sides of the second T-shaped flow channel 66, thereby permitting the entrance of one side bushing 67 to be blocked, which prevents the compressed air being supplied through an exhaust outlet 69 from being leaked and simultaneously enables the compressed air to be supplied through the second connection port 65 to the gear cylinder 23. Thus, the stopper 24 of the gear cylinder 23 is spaced apart from the rotor 20.

Next, the button 41 pressurized at the up side is at a neutral state, as shown in FIG. 8b, and at the same time, the compressed air remaining between the third port 63 and the supply hose of the gear cylinder 23 is discharged through the exhaust outlets 69 formed at the side walls of the through-holes for mounting the third and fourth pressing members 61 and 62, thereby allowing the stopper 24 to engage with the tooth 21 of the rotor 20.

On the other hand, if the height of the cushion seat is lowered, the button 41 is pressed at the other (down) side thereof as shown in FIG. 8c, such that the fourth pressing member 62 is pressurized and simultaneously the fourth port 64 is opened to allow the compressed air inside the air spring 15 to be supplied through the second supply port 43 communicating with the fourth port 64.

The compressed air supplied from the second supply port 43 serves to pressurize and push the slidingly movable member 68 that is slidingly mounted horizontally between the bushings 67 formed at the both sides of the second T-shaped flow channel 66, thereby permitting the entrance of one side bushing 67 to be blocked, which prevents the compressed air being supplied through the exhaust outlet 69 from being leaked and simultaneously enables the compressed air to be supplied through the second connection port 65 to the gear cylinder 23. Thus, the stopper 24 of the gear cylinder 23 is spaced apart from the rotor 20.

Next, the button 41 pressurized at the up side is at the neutral state, as shown in FIG. 8b, and at the same time, the compressed air remaining between the fourth port 64 and the supply hose of the gear cylinder 23 is discharged through the exhaust outlets 69 formed at the side walls of the through-holes for mounting the third and fourth pressing members 61 and 62, thereby allowing the stopper 24 to engage with the tooth 21 of the rotor 20.

As described above, according to the present invention, there is provided the valve-intensive button for adjusting the height of a cushion seat for a vehicle that is capable of simultaneously operating the air spring 15 and the gear cylinder 23 mounted at the underside of the cushion seat by means of one-time manipulation of the button 41.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A valve-intensive button for adjusting the height of a cushion seat for a vehicle, the button comprising:
    an air spring control part having a first port having a first pressing member mounted thereon, a second port having a second pressing member mounted thereon, a first T-shaped flow channel defined by the first port and the second port, and a first connection port adapted to communicate with the first T-shaped flow channel so as to allow compressed air to be supplied and discharged to an air spring; and
    a gear cylinder control part having a third port having a third pressing member mounted thereon, a fourth port having a fourth pressing member mounted thereon, a second T-shaped flow channel defined by the third port and the fourth port, and a second connection port adapted to communicate with the second T-shaped flow channel so as to allow compressed air to be supplied and discharged to a gear cylinder,
    wherein the first and third ports communicate with a first supply port, the fourth port communicates with a second supply port, and the second port has an exhaust through-hole formed at the inside thereof, such that the air spring control part and the gear cylinder control part are coupled as a single body to each other.

2. The valve-intensive button according to claim 1, wherein the second T-shaped flow channel of the gear cylinder control part has a bushing mounted at both sides thereof and a slidingly movable member mounted between the bushings, and each of the third and fourth pressing members has an exhaust hole formed on a through-hole side wall thereof.

3. The valve-intensive button according to claim 1, wherein the first to fourth ports are arranged in such a manner that the first and third ports or the second and fourth ports are pressurized at the time of pressing the button one time.

4. The valve-intensive button according to claim 2, wherein the first to fourth ports are arranged in such a manner that the first and third ports or the second and fourth ports are pressurized at the time of pressing the button one time.

* * * * *